United States Patent [19]
Cox

[11] Patent Number: 6,073,563
[45] Date of Patent: Jun. 13, 2000

[54] AQUATIC PLANTING PROCESS AND RELATED APPARATUS

[75] Inventor: Kenneth M. Cox, Ruskin, Fla.

[73] Assignee: James F. Anderson, Ruskin, Fla.

[21] Appl. No.: 09/226,421

[22] Filed: Jan. 6, 1999

[51] Int. Cl.$^7$ .................................................. A01C 11/02
[52] U.S. Cl. ........................... 111/100; 111/900; 111/918; 111/906; 114/221 R
[58] Field of Search ..................................... 111/114, 200, 111/900, 906, 918, 100, 104, 115; 114/221 R, 221 A; 47/74, 59, 64

[56] References Cited

U.S. PATENT DOCUMENTS

| | | | |
|---|---|---|---|
| 3,982,661 | 9/1976 | Feltrop | 221/235 |
| 4,104,975 | 8/1978 | Ingram et al. | 111/111 |
| 4,111,135 | 9/1978 | Braun et al. | 111/2 |
| 4,133,274 | 1/1979 | Orth et al. | 111/2 |
| 4,713,896 | 12/1987 | Jennens | 37/54 |
| 5,359,948 | 11/1994 | Makkink | 111/177 |
| 5,404,696 | 4/1995 | Vasby | 56/9 |

FOREIGN PATENT DOCUMENTS

| | | |
|---|---|---|
| 2421774 | 11/1975 | German Dem. Rep. |
| 2709692 | 9/1978 | Germany |
| 3941971 | 7/1990 | Germany |

*Primary Examiner*—Victor Batson
*Attorney, Agent, or Firm*—Donald R. Bahr

[57] ABSTRACT

A process and apparatus for planting aquatic plants underwater on the bottom of estuaries whereby an aquatic plant which is ready for transplanting is positioned in a planting nipple having an angular groove in its upper portion. When the planting nipple is brought into contact with the estuary bottom, sea grass plants which are positioned on the angular groove, are planted on the estuary bottom. A plurality of planting nipples are incorporated on the periphery of a planting wheel. A watercraft is used to position the planting wheel with its planting nipples over an area to be planted is provided for. With the process and apparatus of this invention, sea grass plants can be planted on the bottom of an estuary in a semiautomated fashion.

20 Claims, 2 Drawing Sheets

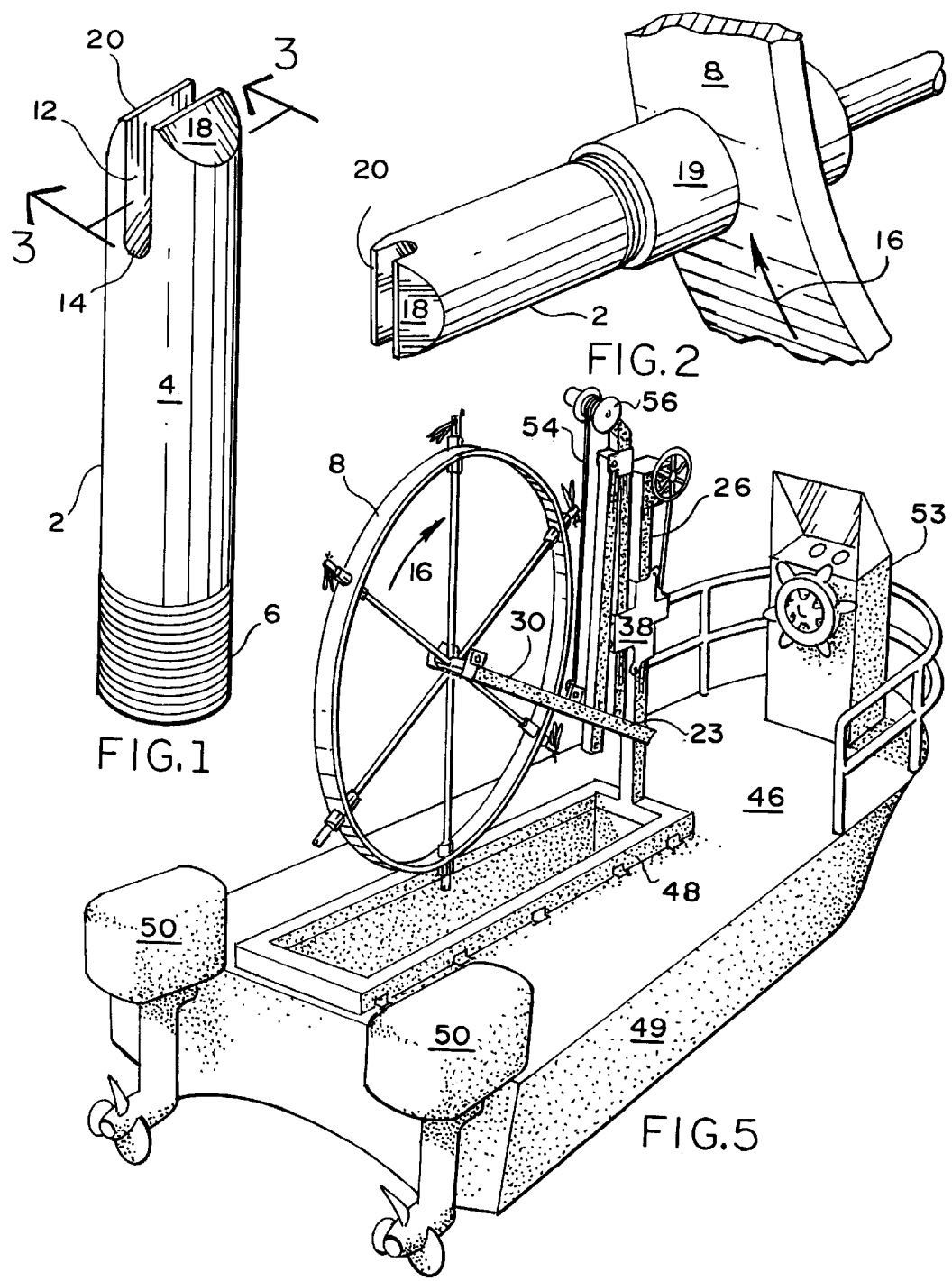

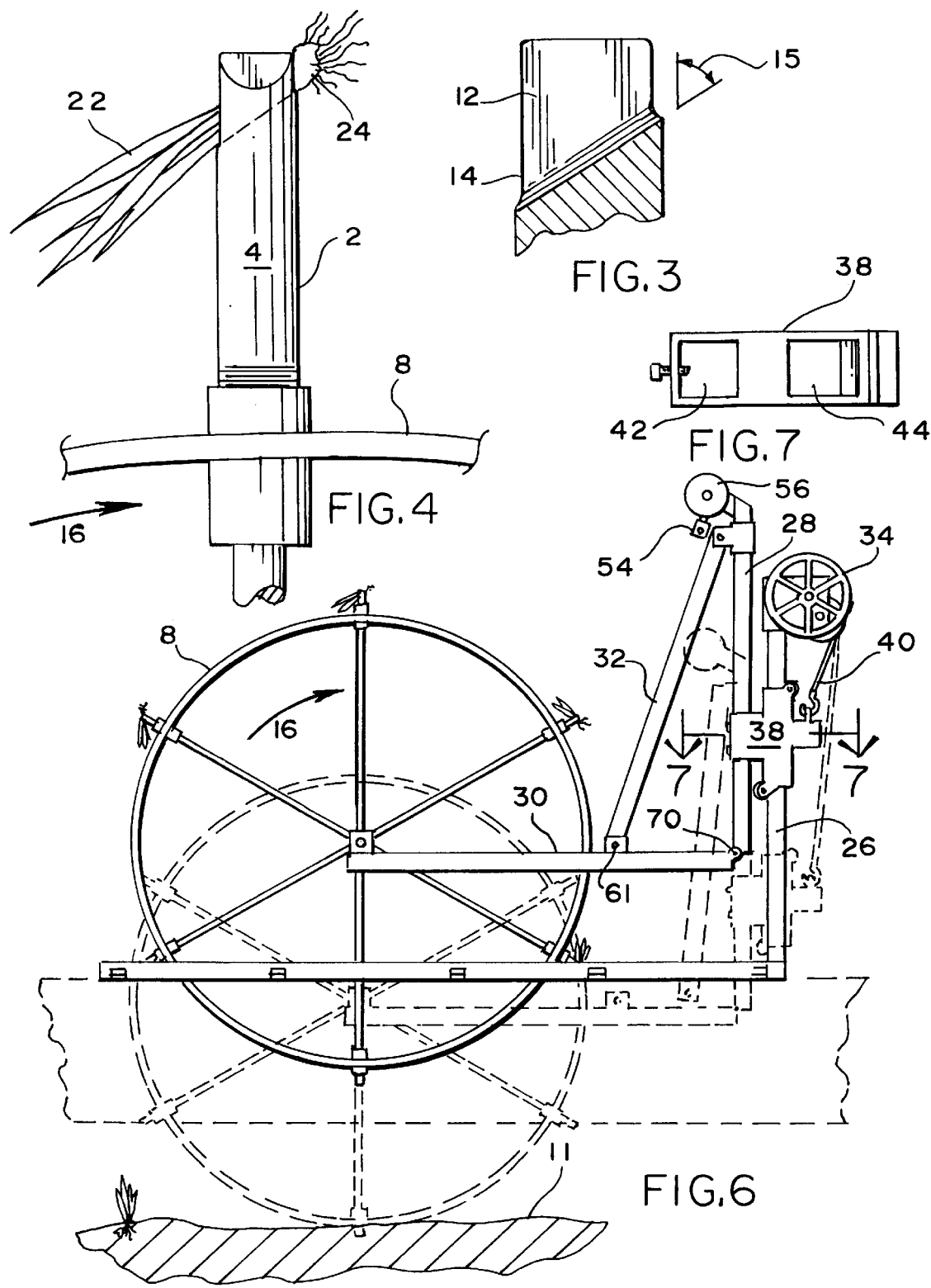

AQUATIC PLANTING PROCESS AND RELATED APPARATUS

BACKGROUND

This invention is concerned with a process and related apparatus whereby aquatic plants may be planted underwater for purposes of restoration. The restoration of all aspects of the environment has become extremely important in recent years. The three areas of restoration which are of primary important are reducing air pollution, restoring and cleaning up the land and cleaning up and restoring our waterways, the ocean and related estuaries. It is these related estuaries that are the primary thrust of the subject invention.

As a result of the decrease in water quality, millions of acres of aquatic plant life, which form an important part of the aquatic Eco system have been destroyed. That is because of a decrease in water quality, in other words pollution, aquatic plant life has been destroyed. In most cases this destruction has been gradual over a long period of years, however, in some instances it can be rapid, for example, as a result of a shipwreck.

Because aquatic plant life is an important part of the complex aquatic environment, the restoration of this plant life is of primary importance.

The natural restoration of aquatic plant life is an extremely slow process. While it is possible to manually plant shoots of aquatic plants due to the cost of labor, the manual planting of sea grass plants has at best been marginally successful. Due to the difficulty of manually planting shoots of aquatic plans, the cost of manually planting just one acre of an estuary can cost many tens of thousands of dollars. Further manual planting in some instances is of questionable success as the person doing the planting in walking over the bottom of an estuary does further damage by crushing other plants which may be growing in the area.

This invention is concerned with a process and apparatus whereby sea grass can be quickly planted in an economical fashion.

As used in connection with this invention, the term aquatic plant life and sea grass includes many species of plant life such as halodule wrightii (shoal grass), thalassia (turtle grass), syringodium filiforme, etc. The apparatus of this invention is particularly suited to the planting of halodule wrightii sea grass.

Aquatic plant life as it exists in estuaries is important in preventing water pollution as this plant life acts as a filter for many pollutants and hence, this plant life helps to maintain water quality.

The restoration of aquatic life to the bottom of our estuaries is extremely important as this aquatic plant life plays a critical function in the total marine Eco system. A large number of important marine animals, both warm and cold blooded, rely totally or in part on aquatic plants as a breeding area, for cover, for food, etc. For example, the endangered manatee relies solely on sea grass as its food source.

OBJECT OF THE INVENTION

The primary object of this invention is a process whereby aquatic plant life may be positioned on and planted in the bottom of an estuary. Still another object is related apparatus whereby this planting may be effected with minimal damage to the bottom of the estuary.

DESCRIPTION OF THE DRAWINGS

FIG. 1 is a perspective view showing the planting nipple of the subject invention.

FIG. 2 is a sectioned perspective view showing the placement of the planting nipple in an underwater planter.

FIG. 3 is a sectioned side view of the planting nipple of this invention taken along line 3—3 of FIG. 1.

FIG. 4 is a side view of the planting nipple of this invention with a bundle of sea grass therein.

FIG. 5 is a perspective view of the underwater planter of this invention.

FIG. 6 is a side view of a planter incorporating the planting nipple of this invention in a planting mode and in a transport mode.

FIG. 7 is a top plan view showing the winch blocks as used on the underwater planter.

DESCRIPTION OF THE PREFERRED EMBODIMENT

The subject invention relates to a process and apparatus for planting aquatic plants such as a wide variety of sea grasses.

Referring to FIGS. 1, 2 and 3, it can be seen that planting nipple 2 as used in this invention comprises an elongated body portion 4 and a threaded section 6 whereby it is attached to planting wheel 8. As is illustrated, planting nipple 2 is tubular, however, it is understood by one skilled in the art that planting wheel 8 could assume other configurations. The function of planting nipple 2 is to position a shoot of sea grass under water and underground on the estuary bottom. To accomplish this end, the threaded section 6 of planting nipple 2 is screwed into the periphery of planting wheel 8 as is illustrated in FIG. 2 and 4.

The end of planting nipple 2 opposite threaded section 6 incorporates a groove 12 having a U-shaped bottom 14 which is angularly disposed to the longitudinal axis of planting nipple 2.

Referring to FIG. 2, it can be seen that planting wheel 8 rotates in the direction of arrow 16. Planting nipple 2 is screwed into a support base 19 which is integral with planting wheel 8. Planting nipple 2 is positioned in planting wheel 8 such that groove 12 is parallel with the axis of rotation of planting wheel 8. Further, the uppermost edge of groove 12 of planting nipple 2 is positioned upward of arrow 16.

The end of planting nipple 2 opposite threaded section 6 is tapered as a result of angular planar surfaces 18 and 20. The function of this taper will be described herein below.

As is shown in FIG. 4, in operation, a bunch of sea grass 22 is positioned in planting nipple 2 such that roots 24 of sea grass 22 are upward of arrow 16.

In the preferred embodiment as is illustrated in FIGS. 2, 5 and 6, planting wheel 8 incorporates a plurality of planting nipples 2 on its periphery. The spacing of planting nipples 2 on planting wheel 8 and the diameter of planting wheel 8 controls the distance at which plants 22 will be planted on the estuary bottom apart from each other.

In operation, the watercraft to which planter 23 is secured is floated over the area to be planted. With the watercraft underway, planter wheel 8 is lowered in such a manner that it comes into contact with estuary bottom 11 as is shown in the dotted lines of FIG. 6. Single or bundles of sea grass plants 22 are then placed in groove 12 of planting nipple 2 with the roots 24 of plants 22 facing forward in the direction of arrow 16. As planting wheel 8 rotates in the direction of arrow 16, the planting nipples 2 as are contained on the periphery of planting wheel 8, are brought into continuous contact with estuary bottom 11. As a result of the taper which is formed on the upper end of nipple 2 by planar surfaces 18 and 20, planting nipple 2 cuts a furrow into estuary bottom 11 when planting nipple is in contact with the estuary bottom. Planar surfaces 18 and 20 can be from about 30 to about 45 degrees in relation to the axis of planting nipple 2.

After the furrow is cut, the root end 24 of sea grass plants 22 come into contact with the bottom of the formed furrow and these plants are removed from planting nipple 2 and more particularly, groove 12. With this sequence the planting of the plants contained in a particular planting nipple 2 is complete. As planting wheel 8 rotates this planting sequence is repeated as additional planting nipples 2 come into contact with estuary bottom 11.

Referring to FIGS. 1 and 2, it can be seen that the upper end of planting nipple 2 incorporates a groove 12 which terminates in a U-shaped bottom 14. The width of groove 12 can be from about 0.25 inches to about 1.00 inches. The width of groove 12 depends on whether a single or multiple plants are being planted and if multiple plants are being planted how many plants are in a bundle.

For general all around usage, it is preferred that the width of groove 12 be about 0.312 inches. Further from FIGS. 1 and 3, it can be seen that the bottom 14 of U-shaped groove 12 is slanted in relation to the axis of planting nipple 2. Angle 15 can be from about 10 degrees to about 80 degrees. The preferred angle for angle 15 is 40 degrees.

Planting nipple 2 can be forged from any convenient metal or from a polymeric material.

In the planting procedure as described above, individual sea grass plants 22 can be used. It is preferred, however, that a bundle of three to five plants be used as if any given plant dies, an adjacent plant is ready to take its place. The use of bundles of plants in a planting greatly increases the chances for a successful planting of a given area.

Planter 23 can be built into any suitable watercraft, however, the preferred watercraft is a twin pontoon float boat. Twin pontoon float boats are preferred as they are very stable and they allow planter 23 to be positioned into and between the twin pontoons.

In planter 23 as is illustrated in FIGS. 5 and 6, planting wheel 8 is illustrated as a circular wheel. It is understood that planting wheel 8 could assume other forms such as a continuous oval track on which is positioned a plurality of planting nipples 2.

From FIGS. 5 and 6 it can be seen that planter 23 further incorporates means whereby the planting wheel nipples 2 as are positioned on planting wheel 8, can be positioned adjacent to the bottom of the estuary at various depths. In most instances an adjustment range wherein planting wheel 8 can be positioned adjacent to the estuary bottom at depths of one to six feet is adequate.

In the embodiment as is illustrated in FIGS. 5 and 6, planter 23 comprises a planting wheel 8 and an adjustment mechanism 26. As can be seen, adjustment mechanism 26 comprises a mast 28 to which is attached a support arm 30. Support arm 30 is further braced by arm 32, support arm 30 may be raised and lowered in such a manner that the periphery of wheel 2 is kept in contact with estuary bottom 11. When planting wheel 8 is raised for transport, arm 32 is attached to support arm 30. When adjustment mechanism 26 is lowered, as is shown in dotted lines, arm 32 is detached from support arm 30, thereby allowing planting wheel 8 to roll freely on estuary bottom 11.

The raising and lowering of support arm 30 on mast 28 is effected by winch block 38 which is in turn supported by shaft 26. Winch block 38 is slidably mounted on shaft 26. Winch 34 is attached to winch block 38 via winch cable 40. As can be seen in FIG. 7, winch block 38 incorporates a pair of apertures 42 and 44 in which are positioned mast 28 and shaft 26. Winch block 38 is secured to mast 28. When winch cable 40 is shorted, winch block 38 is raised, and slides on shaft 26 thereby raising planting wheel 8 such that the planter 23 is suitable for use in shallow water. Conversely when winch cable 40 is lengthened winch block 38 slides downward on shaft 26 and planting wheel 8 is lowered such that the overall structure is suitable for use in deeper water.

As is shown in FIGS. 5 and 6, planter 23 is further supported by frame 48 on deck 46 which is in turn attached to hull 49. From FIG. 5, it can be seen that the preferred hull is a twin pontoon hull which is powered by a pair of outboard motors 50 and steered by steering mechanism 53.

As can be particularly seen in FIG. 6, when the cable 40 of winch 34 is shortened, winch block 38 is raised on shaft 26 thereby causing planting wheel 8 to be raised. This raised posture is used when the planter is being transported on land or water. During transport arm 32 is attached to support arm 30 in order to support planting wheel 8 during the transport process.

As is illustrated in FIG. 5, when hull 49 is positioned in the area where planting is to be effected, arm 32 is detached from support arm 30 at pivot point 61, and support cable 54 is attached to support arm 32 at point 61. This attachment is illustrated in FIG. 5. Support arm 30 can pivot on point 70. When support cable 54 is lengthened arm 30 pivots downward causing wheel 8 to ride on estuary bottom 11. Because support cable 54 is flexible it offers no resistance to the upward movement of arm 30. This lack of resistance to the upward movement of arm 30 allows planting wheel 8 to roll over and to conform to an uneven estuary bottom. That is if planting wheel 8 encounters a depression in the estuary bottom gravity will cause planting wheel 8 to drop into the depression thereby allowing an even planting of aquatic plants on an uneven estuary bottom 11. Conversely, if planting wheel 8 encounters a raised area an estuary bottom 11 planting wheel 8 can easily roll up and conform to the raised area as support cable 54 offers no resistance to the upward movement of planting wheel 8. Support cable 54 is lengthened and shortened by the action of winch 56.

The above description relates to a watercraft which incorporates a single planter and hence a single planting wheel. It is understood that multiple planters can be incorporated into a single watercraft.

The above description and drawings are illustrative of modifications that can be made without departing from the present invention, the scope of which is to be limited only by the following claims.

What is claimed is:

1. An underwater planter for planting aquatic plants comprising:
   a. a hull which has sufficient buoyancy for transporting and positioning the planter to an area where aquatic plants are to be planted underwater;
   b. a planting wheel which is supported by said hull and said planting wheel is adapted to roll underwater over the bottom of an estuary wherein spaced on the periphery of said planting wheel are planting nipples which are adapted to receive aquatic plants wherein said planting nipples incorporate a groove which is adapted to receive and retain at least one plant shoot;
   c. a means for varying the distance that the planting wheel extends below the waterline of said hull;

d. a means for propelling the hull through the water thereby causing the wheel to roll along the estuary bottom causing the aquatic plants to be planted thereon as the planting nipples come into contact with the estuary bottom.

2. The planter of claim 1 wherein the hull is a monohull.

3. The planter of claim 1 wherein the hull comprises two pontoons and the planter is positioned between said pontoons.

4. The planter of claim 1 wherein the planting nipples are elongated, one terminal end being attached to the planting wheel, a second terminal end incorporating said groove, the bottom of which is angularly disposed to the longitudinal axis of the planting nipple.

5. The planter of claim 2 wherein the planting nipples are elongated, one terminal end being attached to the planting wheel, a second terminal end incorporating said groove, the bottom of which is angularly disposed to the longitudinal axis of the planting nipple.

6. The planter of claim 3 wherein the planting nipples are elongated, one terminal end being attached to the planting wheel, a second terminal end incorporating said groove, the bottom of which is angularly disposed to the longitudinal axis of the planting nipple.

7. The planter of claim 4 wherein the second terminal end of the planting nipple is tapered.

8. The planter of claim 5 wherein the second terminal end of the planting nipple is tapered.

9. The planter of claim 6 wherein the second terminal end of the planting nipple is tapered.

10. The planter of claim 7 wherein the bottom of the groove is disposed to the longitudinal axis of the planting nipple at an angle of from about 30 to about 60 degrees.

11. The planter of claim 8 wherein the bottom of the groove is disposed to the longitudinal axis of the planting nipple at an angle of from about 30 to about 60 degrees.

12. The planter of claim 9 wherein the bottom of the groove is disposed to the longitudinal axis of the planting nipple at an angle of from about 30 to about 60 degrees.

13. The planter of claim 10 wherein the groove has a width of from about 0.25 inches to about 0.50 inches.

14. The planter of claim 11 wherein the groove has a width of from about 0.25 inches to about 0.50 inches.

15. The planter of claim 12 wherein the groove has a width of from about 0.25 inches to about 0.50 inches.

16. The planter of claim 13 wherein the width of the groove is about 0.312 inches and the bottom of the groove is disposed to the axis of the planting nipple at an angle of about 40 degrees.

17. A process for planting sea grass in an estuary bottom, underwater, comprising the steps of placing at least one shoot of sea grass in a groove which is integral with a planting nipple, bringing the planting nipple into contact with an estuary bottom in a plane of motion which is parallel with an axis of said slot, thereby causing the shoot of sea grass to be removed from the planting nipple and secured in said estuary bottom.

18. The process of claim 17 wherein the groove in the planting nipple is from about 0.25 to about 1.00 inches wide.

19. The process of claim 18 wherein the bottom of the groove is disposed to the axis of the planting nipple at an angle of from about 30 to about 60 degrees.

20. The process of claim 19 wherein the width of the groove is about 0.312 inches and the angle is about 40 degrees.

* * * * *